United States Patent
Green et al.

(10) Patent No.: US 9,449,197 B2
(45) Date of Patent: Sep. 20, 2016

(54) POOLING ENTROPY TO FACILITATE MOBILE DEVICE-BASED TRUE RANDOM NUMBER GENERATION

(71) Applicant: GLOBALFOUNDRIES Inc., Grand Cayman (KY)

(72) Inventors: Matthew John Green, Biggera Waters (AU); Leigh Stuart McLean, Nerang (AU); Peter Theodore Waltenberg, Robina (AU)

(73) Assignee: GLOBAL FOUNDRIES INC., Grand Cayman (KY)

( * ) Notice: Subject to any disclaimer, the term of this patent is extended or adjusted under 35 U.S.C. 154(b) by 224 days.

(21) Appl. No.: 13/916,655

(22) Filed: Jun. 13, 2013

(65) Prior Publication Data

US 2014/0372767 A1 Dec. 18, 2014

(51) Int. Cl.
G06F 21/72 (2013.01)
G06F 7/58 (2006.01)

(52) U.S. Cl.
CPC ............. *G06F 21/72* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 7,007,050 B2 | 2/2006 | Saarinen | |
| 7,047,262 B2* | 5/2006 | Hars | 708/255 |
| 7,571,199 B1 | 8/2009 | Field et al. | |
| 8,130,955 B2 | 3/2012 | Trichina et al. | |
| 8,131,789 B2 | 3/2012 | Vergnes et al. | |
| 8,612,772 B1* | 12/2013 | Langhammer | G06F 21/76 711/170 |
| 2004/0093306 A1* | 5/2004 | Benoit | G06F 21/558 705/41 |
| 2005/0283566 A1* | 12/2005 | Callaghan | G06F 12/1408 711/104 |
| 2006/0067527 A1* | 3/2006 | Urivskiy et al. | 380/46 |
| 2007/0230694 A1* | 10/2007 | Rose et al. | 380/46 |
| 2009/0132624 A1 | 5/2009 | Haselsteiner et al. | |
| 2009/0262928 A1 | 10/2009 | Busari | |
| 2010/0106756 A1* | 4/2010 | Ellison | 708/212 |
| 2010/0306296 A1* | 12/2010 | Inglett et al. | 708/255 |
| 2011/0022916 A1* | 1/2011 | Desai et al. | 714/748 |
| 2011/0106870 A1* | 5/2011 | Dragone et al. | 708/255 |
| 2013/0086136 A1 | 4/2013 | Inglett et al. | |
| 2013/0145177 A1* | 6/2013 | Cordella | G06F 21/00 713/193 |
| 2014/0040338 A1* | 2/2014 | Van Der Sluis et al. | 708/254 |
| 2015/0055778 A1* | 2/2015 | Cox et al. | 380/46 |

FOREIGN PATENT DOCUMENTS

WO WO2012136763 10/2012

OTHER PUBLICATIONS

Krhovjak, Jan "Cryptographic random and pseudorandom data generators," Dissertation Thesis, available at: http://is.muni.cz/th/39510/fi_d/dissertation_thesis.pdf, 2009.

Krhovjak, et al, "Random numbers and mobile devices," slide presentation available at: http://www.fi.muni.cz/~xkrhovj/lectures/2008_Dresden_RandomNumbersInMobileDevices_slides.pdf, Apr. 2008.

Krhovjak, et al, "The sources of randomness in mobile devices," available at: http://www.fi.muni.cz/usr/matyas/RNG_nordsec07_cameraReady.pdf, 2007.

IBM, "Random number generator which collects hardware-based random numbers from distributed network," available at: http://ip.com/pdf/ipcompad/IPCOM000155799D.pdf, dated Jul. 20, 2007.

IBM, "Mechanism for distributed entropy pool across embedded devices in a collective," available at: http://ip.com/IPCOM/000222857, Oct. 25, 2012.

Lauradoux, et al, "Online entropy estimation for non-binary sources and applications on iPhone," available at: http://hal.inria.fr/docs/00/60/48/57/PDF/RR-7663.pdf, Jun. 2011.

* cited by examiner

*Primary Examiner* — Andrew Nalven
*Assistant Examiner* — Abdulhakim Nobahar
(74) *Attorney, Agent, or Firm* — DeLio, Peterson & Curcio, LLC; David R. Pegnataro

(57) ABSTRACT

A mobile device operating system pools any available entropy. The resulting entropy pool is stored in device memory. When storing entropy in memory, preferably memory addresses are randomly allocated to prevent an attacker from capturing entropy that might have already been used to create a random number. The stored entropy pool provides a readily-available entropy source for any entropy required by the operating system or device applications. Then, when a cryptographic application requests a true random number, the operating system checks to determine whether the pool has available entropy and, if so, a portion of the entropy is provided to enable generation (e.g., by a TRNG) of a true random number that, in turn, may then be used for some cryptographic operation. After providing the entropy, the operating system clears the address locations that were used to provide it so that another entity cannot re-use the entropy.

14 Claims, 10 Drawing Sheets

| 0x000CFF00 | ???? ???? | ???? ???? | ???? ???? | ???? ???? |
|---|---|---|---|---|
| 0x000CFF10 | ???? ???? | ???? ???? | ???? ???? | ???? ???? |
| 0x000CFF20 | ???? ???? | ???? ???? | ???? ???? | ???? ???? |
| 0x000CFF30 | ???? ???? | ???? ???? | ???? ???? | ???? ???? |
| 0x000CFF40 | ???? ???? | ???? ???? | ???? ???? | ???? ???? |

FIG. 8

| 0x000CFF00 | 3453 F2CB | FA87 7FDE | 23C9 234A | FBC2 A347 |
|---|---|---|---|---|
| 0x000CFF10 | ???? ???? | ???? ???? | ???? ???? | ???? ???? |
| 0x000CFF20 | ???? ???? | ???? ???? | ???? ???? | ???? ???? |
| 0x000CFF30 | ???? ???? | ???? ???? | ???? ???? | ???? ???? |
| 0x000CFF40 | ???? ???? | ???? ???? | ???? ???? | ???? ???? |

FIG. 9

| 0x000CFF00 | 3453 F2CB | FA87 7FDE | 23C9 234A | FBC2 A347 |
|---|---|---|---|---|
| 0x000CFF10 | 356A EE94 | EF34 F667 | D456 D6E4 | 126D FE89 |
| 0x000CFF20 | 456D D4E6 | 2780 EF57 | 2DEF 324E | AB5C 067A |
| 0x000CFF30 | ???? ???? | ???? ???? | ???? ???? | ???? ???? |
| 0x000CFF40 | ???? ???? | ???? ???? | ???? ???? | ???? ???? |

FIG. 10

| 0x000CFF00 | 0000 0000 | 0000 0000 | 0000 0000 | 0000 0000 |
|---|---|---|---|---|
| 0x000CFF10 | 0000 0000 | EF34 F667 | D456 D6E4 | 126D FE89 |
| 0x000CFF20 | 456D D4E6 | 2780 EF57 | 2DEF 324E | AB5C 067A |
| 0x000CFF30 | ???? ???? | ???? ???? | ???? ???? | ???? ???? |
| 0x000CFF40 | ???? ???? | ???? ???? | ???? ???? | ???? ???? |

FIG. 11

| 0x000CFF00 | 0000 0000 | 0000 0000 | 0000 0000 | 0000 0000 |
|---|---|---|---|---|
| 0x000CFF10 | 0000 0000 | EF34 F667 | D456 D6E4 | 126D FE89 |
| 0x000CFF20 | 456D D4E6 | 2780 EF57 | 2DEF 324E | AB5C 067A |
| 0x000CFF30 | 2780 EF57 | D456 D6E4 | 456D D4E6 | 126D FE89 |
| 0x000CFF40 | 456D D4E6 | 126D FE89 | EF34 5667 | 456D D4E6 |

FIG. 12

| 0x000BA200 | 126D FE89 | ???? ???? | ???? ???? | ???? ???? |
|---|---|---|---|---|
| 0x000BA210 | ???? ???? | ???? ???? | ???? ???? | ???? ???? |
| 0x000BA220 | ???? ???? | ???? ???? | ???? ???? | ???? ???? |
| 0x000BA230 | ???? ???? | ???? ???? | ???? ???? | ???? ???? |
| 0x000BA240 | ???? ???? | ???? ???? | ???? ???? | ???? ???? |

FIG. 13

| 0x000CFF00 | 0000 0000 | 0000 0000 | 0000 0000 | 0000 0000 |
|---|---|---|---|---|
| 0x000CFF10 | 0000 0000 | EF34 F667 | D456 D6E4 | 126D FE89 |
| 0x000CFF20 | 456D D4E6 | 2780 EF57 | 2DEF 324E | AB5C 067A |
| 0x000CFF30 | 2780 EF57 | D456 D6E4 | 456D D4E6 | 126D FE89 |
| 0x000CFF40 | 456D D4E6 | 126D FE89 | EF34 5667 | 456D D4E6 |

| 0x000BA200 | 126D FE89 | 456D D4E6 | D456 D6E4 | 126D FE89 |
|---|---|---|---|---|
| 0x000BA210 | 2780 EF57 | 126D FE89 | 456D D4E6 | 126D FE89 |
| 0x000BA220 | EF34 5667 | 456D D4E6 | 126D FE89 | EF34 5667 |
| 0x000BA230 | 456D D4E6 | D456 D6E4 | 456D D4E6 | 126D FE89 |
| 0x000BA240 | 456D D4E6 | EF34 5667 | 2780 EF57 | 456D D4E6 |

FIG. 14

| 0x000CFF00 | 0000 0000 | 0000 0000 | 0000 0000 | 0000 0000 |
|---|---|---|---|---|
| 0x000CFF10 | 0000 0000 | EF34 F667 | D456 D6E4 | 126D FE89 |
| 0x000CFF20 | 456D D4E6 | 2780 EF57 | 2DEF 324E | AB5C 067A |
| 0x000CFF30 | 2780 EF57 | D456 D6E4 | 456D D4E6 | 126D FE89 |
| 0x000CFF40 | 456D D4E6 | 126D FE89 | EF34 5667 | 456D D4E6 |

| 0x000BA200 | 126D FE89 | 456D D4E6 | D456 D6E4 | 126D FE89 |
|---|---|---|---|---|
| 0x000BA210 | 2780 EF57 | 126D FE89 | 456D D4E6 | 126D FE89 |
| 0x000BA220 | EF34 5667 | 456D D4E6 | 126D FE89 | EF34 5667 |
| 0x000BA230 | 456D D4E6 | D456 D6E4 | 456D D4E6 | 126D FE89 |
| 0x000BA240 | 456D D4E6 | EF34 5667 | 2780 EF57 | 456D D4E6 |

| 0x000FF200 | 126D FE89 | 456D D4E6 | D456 D6E4 | 126D FE89 |
|---|---|---|---|---|
| 0x000FF210 | 2780 EF57 | ???? ???? | ???? ???? | ???? ???? |
| 0x000FF220 | ???? ???? | ???? ???? | ???? ???? | ???? ???? |
| 0x000FF230 | ???? ???? | ???? ???? | ???? ???? | ???? ???? |
| 0x000FF240 | ???? ???? | ???? ???? | ???? ???? | ???? ???? |

FIG. 15

| 0x000CFF00 | 0000 0000 | 0000 0000 | 0000 0000 | 0000 0000 |
|---|---|---|---|---|
| 0x000CFF10 | 0000 0000 | 0000 0000 | 0000 0000 | 0000 0000 |
| 0x000CFF20 | 0000 0000 | 0000 0000 | 0000 0000 | 0000 0000 |
| 0x000CFF30 | 0000 0000 | 0000 0000 | 0000 0000 | 0000 0000 |
| 0x000CFF40 | 0000 0000 | 0000 0000 | 0000 0000 | 0000 0000 |

| 0x000BA200 | 0000 0000 | 456D D4E6 | D456 D6E4 | 126D FE89 |
|---|---|---|---|---|
| 0x000BA210 | 2780 EF57 | 126D FE89 | 456D D4E6 | 126D FE89 |
| 0x000BA220 | EF34 5667 | 456D D4E6 | 126D FE89 | EF34 5667 |
| 0x000BA230 | 456D D4E6 | D456 D6E4 | 456D D4E6 | 126D FE89 |
| 0x000BA240 | 456D D4E6 | EF34 5667 | 2780 EF57 | 456D D4E6 |

| 0x000FF200 | 126D FE89 | 456D D4E6 | D456 D6E4 | 126D FE89 |
|---|---|---|---|---|
| 0x000FF210 | 2780 EF57 | ???? ???? | ???? ???? | ???? ???? |
| 0x000FF220 | ???? ???? | ???? ???? | ???? ???? | ???? ???? |
| 0x000FF230 | ???? ???? | ???? ???? | ???? ???? | ???? ???? |
| 0x000FF240 | ???? ???? | ???? ???? | ???? ???? | ???? ???? |

FIG. 16

| 0x000BA200 | 0000 0000 | 456D D4E6 | D456 D6E4 | 126D FE89 |
| --- | --- | --- | --- | --- |
| 0x000BA210 | 2780 EF57 | 126D FE89 | 456D D4E6 | 126D FE89 |
| 0x000BA220 | EF34 5667 | 456D D4E6 | 126D FE89 | EF34 5667 |
| 0x000BA230 | 456D D4E6 | D456 D6E4 | 456D D4E6 | 126D FE89 |
| 0x000BA240 | 456D D4E6 | EF34 5667 | 2780 EF57 | 456D D4E6 |

| 0x000FF200 | 126D FE89 | 456D D4E6 | D456 D6E4 | 126D FE89 |
| --- | --- | --- | --- | --- |
| 0x000FF210 | 2780 EF57 | ???? ???? | ???? ???? | ???? ???? |
| 0x000FF220 | ???? ???? | ???? ???? | ???? ???? | ???? ???? |
| 0x000FF230 | ???? ???? | ???? ???? | ???? ???? | ???? ???? |
| 0x000FF240 | ???? ???? | ???? ???? | ???? ???? | ???? ???? |

FIG. 17

POOLING ENTROPY TO FACILITATE MOBILE DEVICE-BASED TRUE RANDOM NUMBER GENERATION

BACKGROUND OF THE INVENTION

1. Technical Field

This disclosure relates generally to securing data on mobile devices using cryptographic techniques and, in particular, to pooling entropy to facilitate device-based generation of true random numbers that can be used in cryptographic operations.

2. Background of the Related Art

Random numbers are used in many aspects of modern computer systems. In particular, random numbers are often used in generating appropriate security parameters in a computer system. Computer systems, however, often have a difficult time generating high quality random numbers, i.e., sequences of numbers that are close to being truly random. There are many algorithms that appear to generate random numbers but they typically generate the same sequence of numbers, thus suffering from predictability. Some computer systems attempt to add entropy to a mechanism that generates random numbers as a way to generate differing sequences of random numbers. Entropy refers to a measure of the uncertainty associated with a random number. There are not many good sources of entropy on most computer systems. Some computer systems, for example, rely on the seemingly random behavior of a human typing on a keyboard or moving a mouse pointer to introduce entropy. Other known techniques for adding entropy involve the use of time intervals between interrupts, or the occurrence of network errors, although these are not very useful due to the regularity of these intervals or the ability of outside forces to manipulate these intervals. Moreover, computer systems that have limited user input have difficulty adding entropy to the system to improve the quality of random number generation. For example, embedded systems or highly parallel computer systems may need high-quality random numbers, but they may lack the user input as a source of entropy to improve the quality of random number generation.

Mobile devices, including tablets and smart phones, are commonplace and increasingly being used over networks and the wider Internet. These devices are being used frequently to transfer secure data such as passwords, personal details, credit card transactions, voice-over-IP calls, and the like. As a consequence, there is an increasing need to make such mobile devices more secure. While these devices often have sufficient hardware to perform cryptographic functions (including encryption and decryption), many cryptographic functions require for support a random number generator. Although many of these devices use a pseudo random number generator for many cryptographic functions, a true random number generator (TRNG) is preferred when available. A TRNG is useful for generating various cryptographic materials, such as keys, nonces, one-time pads, and salts. Currently, however, mobile devices do not provide hardware-based TRNGs that software can call readily, especially at high throughput.

The sources of high throughput entropy on mobile devices are not always available to produce TRNGs. The common entropy sources on mobile devices typically include the following: batteries, microphones, cameras, wireless signals, touch screens, accelerometers, magnetometers, and the like. It is well-known to use such sources for entropy and thus true random number generation. One problem with this approach is that these sources are only available for short time periods and/or are not always capable of producing entropy in certain situations. In particular, the device operating system often turns off this hardware when not in use (to conserve battery). Turning on microphones, cameras, wireless interfaces, and the like, draws significant power that can have significant adverse effects on the device's battery life. Without the use of such devices as entropy sources, TRNGs can be difficult and time-consuming to generate. Applications having a need to produce TRNGs thus struggle to find a reliable entropy source that is high throughput and readily available without relying on the operating system to switch on and use a hardware device to capture entropy. Moreover, the demand for high throughput entropy (to create TRNGs) will only be increasing as mobile devices become more essential in environments, especially those that require secure communications (such as VoIP, VPN, and the like). These operations require a very high entropy throughput to create the TRNGs required for such computationally-intensive secure communication. Indeed, currently the entropy required for these types of operating scenarios is simply not available on today's mobile devices.

With the significance and high importance of security even when entropy is made available by hardware, the complexity of an application gaining access to the hardware and given entropy can deter the application from following security and cryptography best practices.

There remains a need to provide mobile devices with an improved way to provide adequate sources of entropy to enable the system to produce with high throughput TRNGs that are needed to support cryptographic operations.

BRIEF SUMMARY

According to this disclosure, a mobile device mechanism (e.g., an operating system) pools any available entropy when it is made available. The resulting entropy pool is stored in device memory or associated data stores (e.g., cryptographic memory, RAM, hard drive, flash, or the like). When storing entropy in memory, preferably memory addresses are randomly allocated to prevent an attacker from capturing entropy that might have already been used to create a random number. The stored entropy pool provides a readily-available entropy source for any entropy required by the operating system or device applications. Then, when a cryptographic application requests a true random number, the operating system checks to determine whether the pool has available entropy and, if so, a portion of the entropy is provided to enable generation (e.g., by a TRNG) of a true random number that, in turn, may then be used for some cryptographic operation. After providing the entropy, the operating system clears (e.g., zeroes) the address locations that were used to provide it so that another entity cannot re-use the entropy (and thus potentially compromise some future cryptographic operation). If the mobile device operating system becomes low on available entropy, however, it may fall back to direct hardware-based entropy to keep up with additional requests for true random numbers.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIGS. 8-17 illustrate the allocating, storing, retrieval, zeroing and freeing of device memory locations to generate and manage the entropy pool according to this disclosure.

DETAILED DESCRIPTION OF AN ILLUSTRATIVE EMBODIMENT

Figure 1:
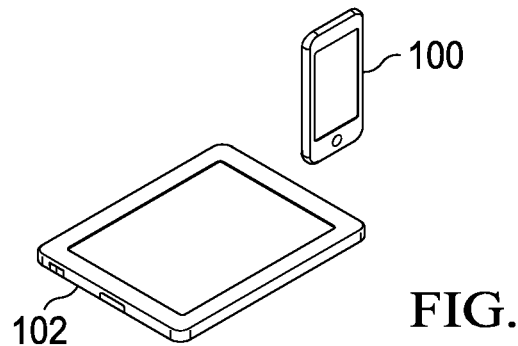
FIG. 1 depicts an exemplary block diagram of a representative mobile device in which the techniques of this disclosure may be implemented.
Figure 2:
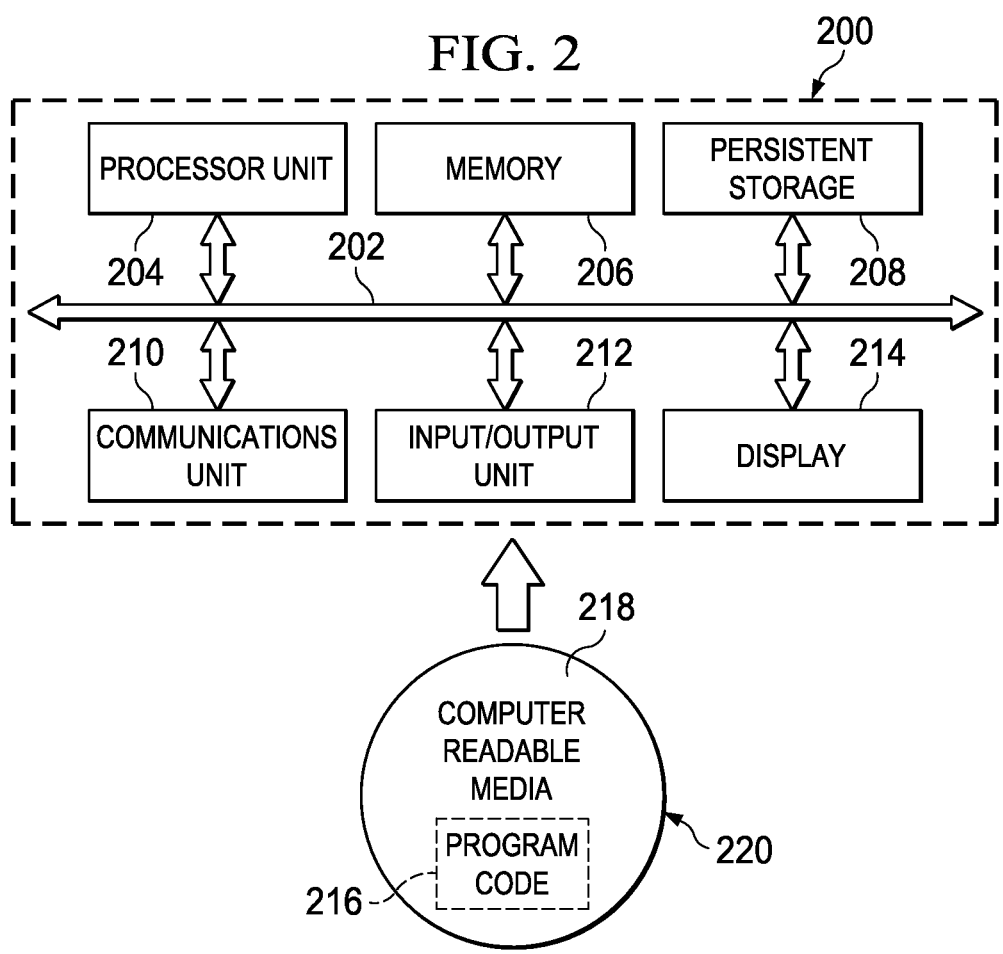
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

FIG. 1 illustrates representative mobile devices, namely, a smartphone 100, and a tablet device 102. As is well-known, such devices typically comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications including, without limitation, applications that require or take advantage of cryptographic operations. Such operations may be associated with a particular application, or the device operating system itself. As will be described, the techniques herein may be implemented with respect to any computing entity application that requires a cryptographic operation that is facilitated with mobile device-resident cryptographic materials (e.g., keys, nonces, one-time pads, and salts). Further, the disclosed entropy pooling technique may be used with any form of cryptographic scheme (including, without limitation, encryption/decryption, digital signature generation and verification, message validation, and the like) or cryptographic protocol.

With reference now to FIG. 2, a block diagram of an exemplary data processing system is shown in which aspects of the illustrative embodiments may be implemented. Data processing system 200 is an example of a computer, such as mobile device 100 or 102 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as a mobile device of FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, Objective C, C++ or the like, and conventional procedural programming languages, such as the "C" programming language or similar programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Without limitation, the techniques described herein may operate in conjunction within mobile devices operating according to a standard client-server paradigm in which client machines communicate with an Internet-accessible server(s) executing on a set of one or more machines. In such a scenario, end users operate Internet-connectable devices (e.g., Internet-enabled mobile devices, or the like) that are capable of accessing and interacting with the server(s). Typically, each client or server machine is a data processing system such as illustrated in FIG. 2 comprising hardware and software, and these entities communicate with one another over a network, such as the Internet, an intranet, an extranet, a private network, or any other communications medium or link. Generalizing, a data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

Figure 3:
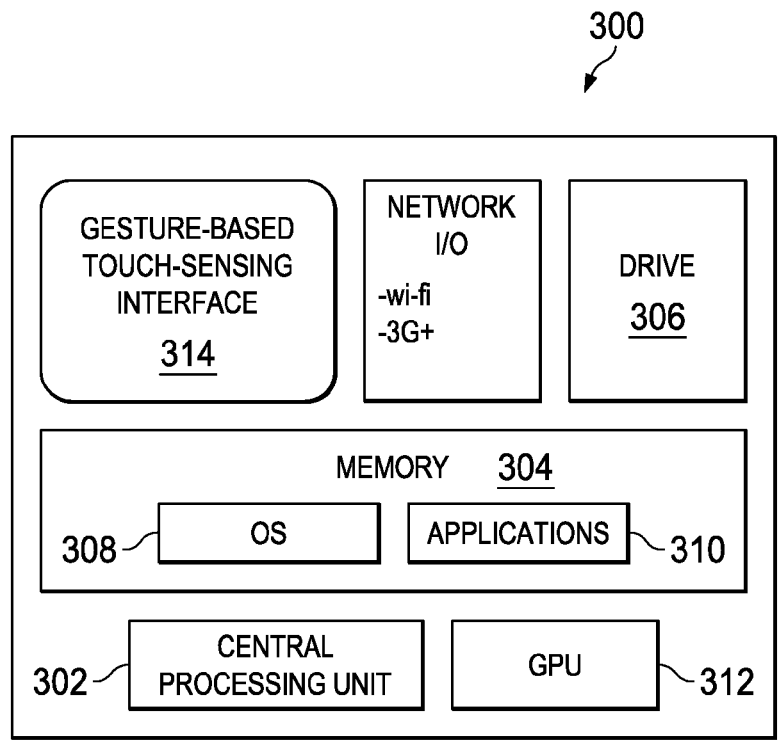
FIG. 3 illustrates the mobile device of FIG. 1 in additional detail.

As described above, mobile device technologies also are well-known. In a representative but non-limiting embodiment, a mobile device is a smartphone or tablet, such as the iPhone® or iPad®, an Android™-based mobile device, or the like. As seen in FIG. 3, a device 300 of this type typically comprises a CPU 302, computer memory 304, such as RAM, and a data store 306. The device software includes operating system (e.g., Apple iOS, Android, Blackberry OS, Windows Mobile, or the like) 308, and generic support applications and utilities 310. Typically, the device includes a separate graphics processing unit (GPU) 312. A touch-sensing device or interface 314, such as a touch screen, is configured to receive input from a user's touch and to send this information to processor 312. The interface 314 responds to gestures on the touch sensitive surface. Other input/output devices include software-based keyboards, cameras, microphones, accelerometers, magnetometers, radio or WiFi mechanisms, and the like.

More generally, the mobile device is any wireless client device, e.g., a cellphone, pager, a personal digital assistant (PDA, e.g., with GPRS NIC, WiFi card, etc.), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

For example, a mobile device as used herein is a 3G—(or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Entropy Pooling on a Mobile Device

According to this disclosure, a mobile device mechanism (e.g., an operating system) pools any available entropy when it is made available. The resulting entropy pool is stored in device memory or associated data stores (e.g., cryptographic memory, RAM, hard drive, flash, or the like). When storing entropy in memory, preferably memory addresses are randomly allocated to prevent an attacker from capturing entropy that might have already been used to create a random number. The stored entropy pool provides a readily-available entropy source for any entropy required by the operating system or device applications. Then, when a cryptographic application requests a true random number, the operating system checks to determine whether the pool has available entropy and, if so, a portion of the entropy is provided to enable generation (e.g., by a TRNG) of a true random number that, in turn, may then be used for some cryptographic operation. After providing the entropy, the operating system clears (e.g., zeroes) the address locations that were used to provide it so that another entity cannot re-use the entropy (and thus potentially compromise some future cryptographic operation). If the mobile device operating system becomes low on available entropy, however, it may fall back to direct hardware-based entropy to keep up with additional requests for true random numbers.

Figure 4:
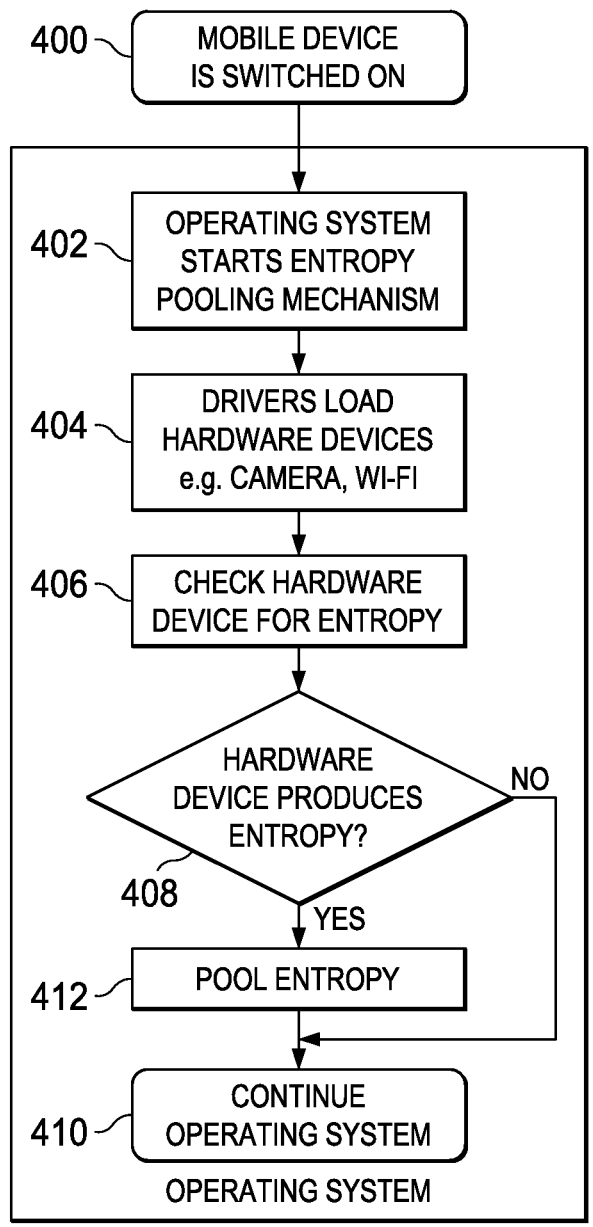
FIG. 4 illustrates a process flow for entropy pooling on the mobile device startup.

FIG. 4 illustrates a process for entropy pooling at mobile device start-up. This process flow may take place within the device operating system. The process begins at step 400 when the mobile device is switched on. At step 402, the mobile device operating system starts an entropy pooling mechanism, which executes as a background task or process. At step 404, and in connection with the startup, the device drivers load the various hardware devices (e.g., camera, WiFi support, and the like). The entropy pooling mechanism then begins entropy checking. To that end, each hardware device is checked for available entropy at step 406. A test is then performed at step 408 to determine if the hardware device is producing entropy. If the outcome of the test at step 408 indicates that the hardware device is not producing entropy, the routine continues at step 410 with the operating system continuing its usual operation. If, however, the outcome of the test at step 408 indicates that the hardware device is producing entropy, that entropy is then added to the entropy pool at step 412. Control then continues at step 410. If additional hardware devices are to be checked, the operating system returns control back to step 406, and the process repeats.

Figure 5:
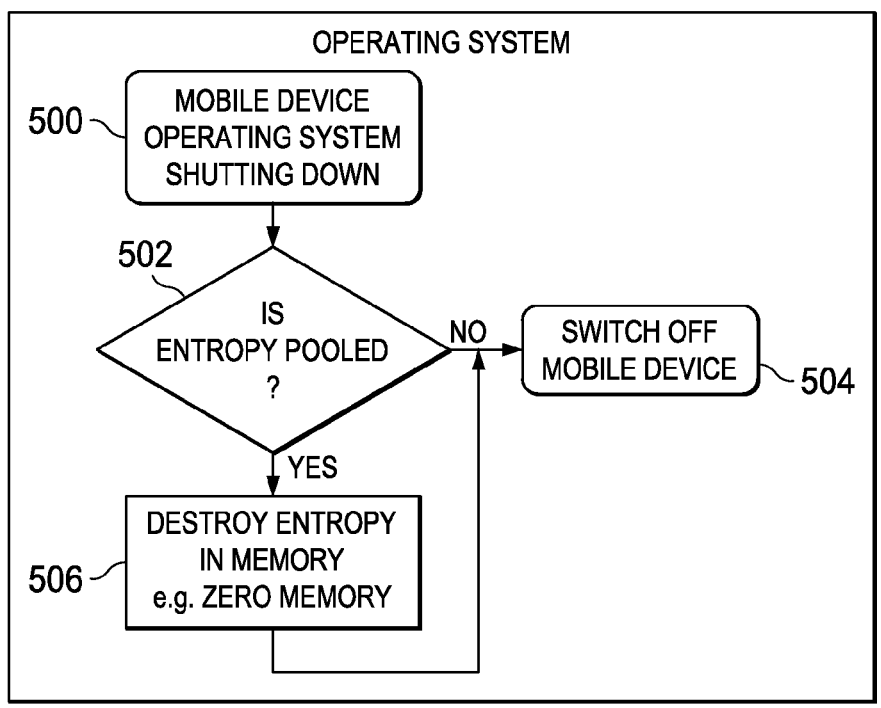
FIG. 5 illustrates a process flow for destroying the entropy pool on mobile device shut-down.

FIG. 5 illustrates a process for the device operating system to destroy the entropy pool upon device shut-down. By destroying the entropy pool, the entropy therein cannot be re-used (e.g., to attempt to re-create the previously-generated random number(s)). The process begins at step 500 when the mobile device operating system starts to shut-down. A test is then performed at step 502 to determine whether entropy is pooled (in the entropy pool). If the outcome of the test at step 502 indicates that there is no entropy in the pool, control then continues at step 504 and the mobile device is switched off. If, however, the outcome of the test at step 502 indicates that there is entropy in the pool, the routine continues at step 506 to destroy the entropy. Typically, this operation involves wiping the memory.

Figure 6:
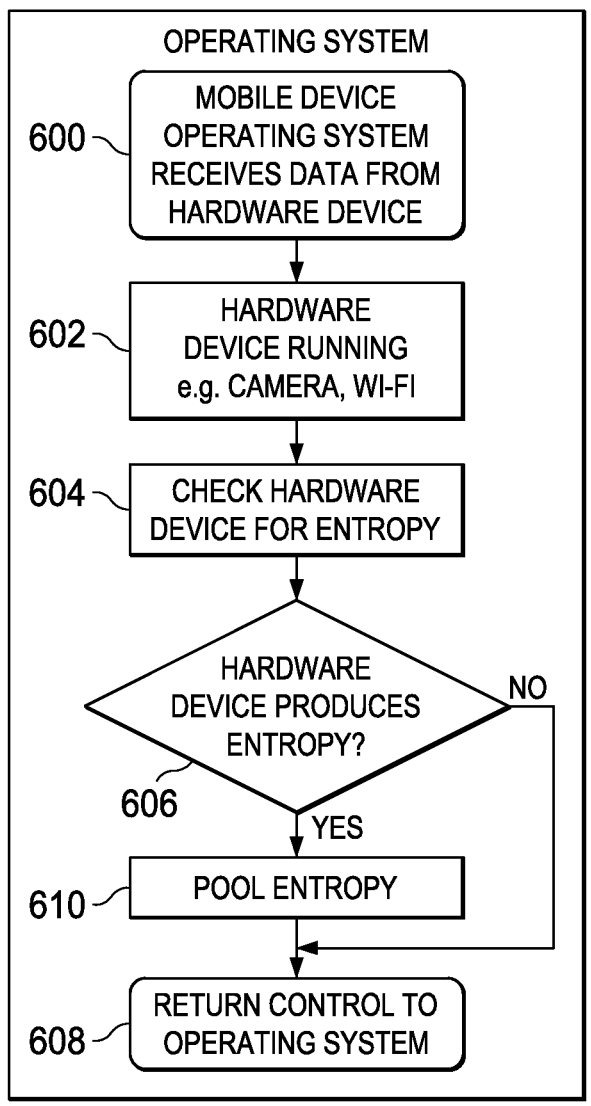
FIG. 6 illustrates a process flow for entropy pooling on the mobile device upon startup of particular hardware.

FIG. 6 illustrates a process for entropy pooling on hardware device start-up. A particular hardware device may be started at any time and not necessarily just at device startup. The steps in FIG. 6 typically occur within the device operating system, although this is not a limitation. In this embodiment, the process begins at step 600 when the mobile device operating system receives data from the hardware device. At step 602, the hardware device operates, performing its usual function(s). At step 604, the entropy pooling mechanism checks the hardware device for entropy. A test is then performed at step 606 to determine if the hardware device is producing entropy. If the outcome of the test at step 606 indicates that the hardware device is not producing entropy, the routine continues at step 608 to return control back to the operating system. If, however, the outcome of the test at step 606 indicates that the hardware device is producing entropy, that entropy is then added to the entropy pool at step 610. Control then continues at step 608.

Figure 7:
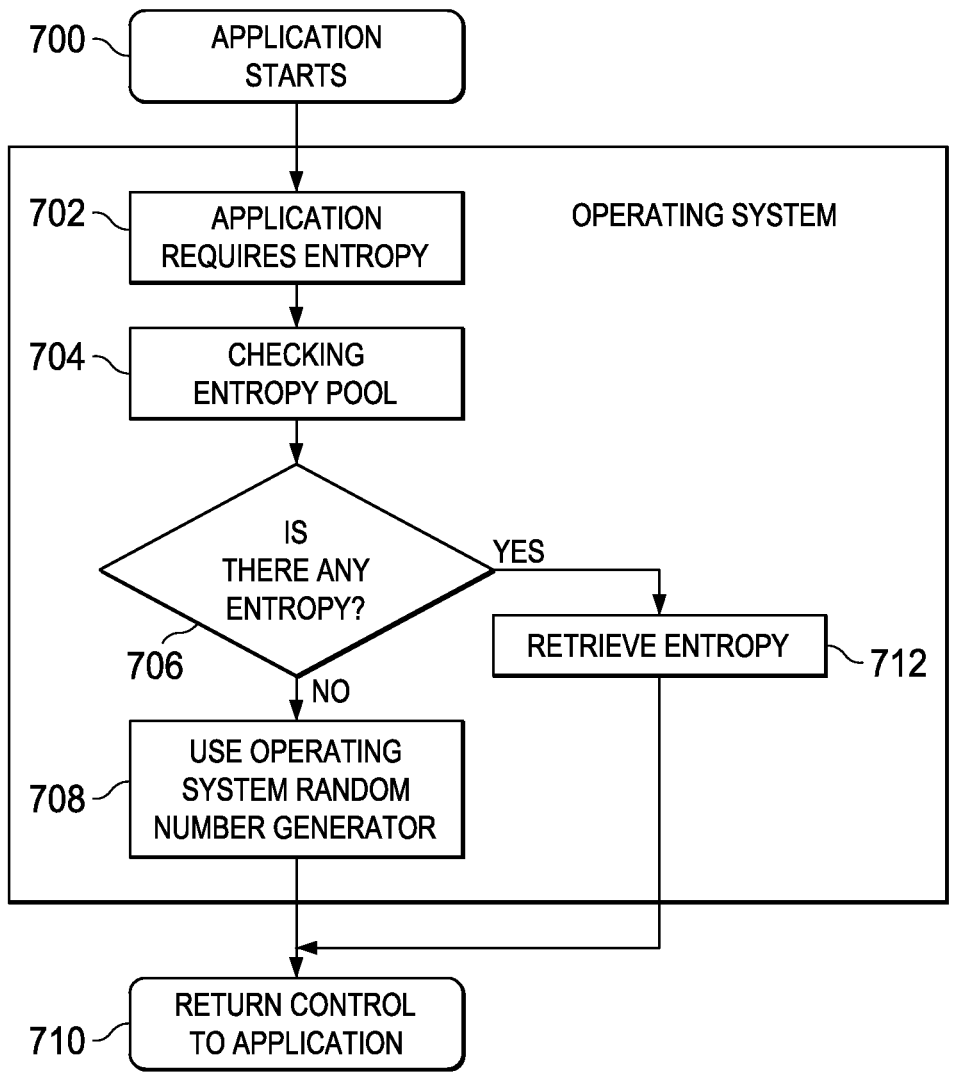
FIG. 7 illustrates a process flow for entropy retrieval from the entropy pool.

FIG. 7 illustrates a process for retrieving entropy from the entropy pool to facilitate generation of a true random number for some cryptographic operation. In this embodiment, the retrieval operations are carried out by the device operating system with respect to an entropy pool that has been created according to the techniques shown, e.g., in FIGS. 4 and 6. The routine begins at step 700 with the application starting. At step 702, the operating system receives an indication that an application needs entropy from the pool to facilitate a cryptographic operation. The operating system responds at step 704 by checking the entropy pool. A test is then performed at step 706 to determine whether there is any available entropy in the pool. If the outcome of the test at step 706 indicates that there is not available (or insufficient) entropy in the pool, control branches to step 708. The operating system then uses an operating system-based random number generator to provide the required random number. This is a fallback (or failover) operation, as preferably the entropy pool is used. After the true random number generator generates the true random number, control returns to the application at step 710. If, however, the outcome of the test at step 706 indicates that there is available entropy in the pool, the routine continues at step 712 with the operating system retrieving the entropy from the pool. The entropy is then returned to the application and control is returned at step 710.

While the various operations are illustrated in the context of a mobile device operating system, this is not a limitation. The operations may be carried out in whole or in part by a dedicated entropy pooling application, or in combination with various operating system resources. The particular implementation of the entropy pooling creation, management and maintenance may be quite varied depending on available device resources.

Although typically the entropy pool is located on-board the mobile device, theoretically it may be stored in some ancillary data store, such as a Flash drive.

FIGS. 8-17 illustrate the allocating, storing, retrieval, zeroing and freeing of device memory locations to generate and manage the entropy pool according to this disclosure. The operating scenarios are merely exemplary.

FIG. 8 illustrates a first area of device memory with random addresses (hex 0x000CFF00 through 0x000CFF40). At this point, no entropy has been associated with any of those addresses.

FIG. 9 illustrates entropy being stored at addresses (hex 0x000CFF00-CFF08) in the first area of the memory when a first hardware device (e.g., a microphone) is used. The entropy pool then comprises the data in these address locations.

FIG. 10 illustrates additional entropy being stored at the next contiguous addresses (hex 0x000CFF10-CF28) in the first area of the memory when a second hardware device (e.g., a camera) is used. As a result, the entropy pool thus has been enlarged to include the data in these additional locations.

FIG. 11 illustrates the first area of the memory after the operating system has retrieved and zeroed out some of the entropy (namely, from locations hex 0x000CFF00-CFF12). The entropy pool then comprises just the data at the addresses hex 0x000CFF14-CFF28. As illustrated, once the entropy is retrieved from the entropy pool, the addresses are zeroed out for security (to prevent re-use).

FIG. 12 illustrates further storing of entropy when a third hardware device (e.g., WiFi) is used and entropy is generated. As illustrated, preferably the additional entropy gets stored at what are now the next-available contiguous locations (addresses hex 0x000CFF30-CFF48) in the first area and not in the just-cleared locations (corresponding to addresses 0x000CFF00-CFF12). Preferably, the cleared locations are not re-used to prevent security compromises (e.g., by re-use of the previously-used entropy data). As also can be seen, as a result of the additional entropy data filling up what remained of the first area, the resulting entropy pool is again enlarged but now used up all of the available storage locations in the first area of the memory. Because additional memory for the pool is now needed, and because preferably the previously-cleared areas are not re-used, the operating system then establishes a second area of the memory to receive additional entropy. FIG. 13 illustrates the second area of the memory allocated to maintain the entropy pool. This allocation of additional area(s) of memory may be carried out dynamically or during an entropy pool configuration operation. In this example, the second area corresponds to locations at the following addresses: hex 0x000BA200-0x000BA248. In this example, some of the entropy from the WiFi use then gets placed in the second area of the memory. The resulting entropy pool comprises locations hex 0x000CFF20-CFF48 in the first area, together with locations 0x000BA202 in the second area. The area(s) allocated by the operating system may be of the same or different size. Moreover, and as illustrated, typically the areas are not contiguous to one another.

FIG. 14 illustrates storing of additional entropy when a fourth hardware device (e.g., a battery) has available entropy. As a result, the available locations in the second area of the memory are now filled to create the newly-enlarged entropy pool across both the first and second memory areas.

FIG. 15 illustrates storing of still additional entropy data when a fifth hardware device (e.g., Bluetooth) has available entropy. Because the first and second areas have been filled, the operating system allocates a third area of memory (e.g., at hex addresses 0x000FF200-FF248) whose locations then receive and store the additional entropy data as illustrated.

FIG. 16 illustrates the memory state after entropy is retrieved once again for random number generation and zeroing out of the retrieved entropy. At this point, all of the first area has been freed up, as has a portion of the second area. The third area still includes available locations for storing additional entropy data.

FIG. 17 illustrates the memory after being freed of the entropy. At this point, and because it should not be re-used, the first area has been returned to the operating system. The entropy pool then remains across the second and third areas as shown.

As the above examples illustrates, as the mobile device itself and/or its various hardware devices start up and generate entropy data, the entropy is added to the entropy pool. The pool itself typically varies continuously, as has been described and illustrated. As also described above, there may be situations when the entropy pool is not sufficiently large enough to provide entropy data that may be required for a particular operation. In such case, the fail-over source of entropy data may be used.

Preferably, and as illustrated, the operating system randomly allocates the memory areas as they are needed to support the continuously-varying entropy pool. As a result, typically the entropy pool (to the extent it spans more than one area) is not located in contiguous area(s) of the memory but, rather, may comprise entropy data from multiple distinct memory locations. Once a memory area has been used for storing entropy but has then been cleared, that particular area preferably is no longer re-used to store entropy. Also, preferably entropy is retrieved from the entropy pool in a first-in, first out (FIFO) manner, with the oldest entropy data being retrieved when entropy is needed. Other entropy data storage and retrieval schemes (e.g., LIFO, or the like) may be used as well.

Thus, according to this disclosure, a method of generating a true random number for use in a cryptographic operation by receiving entropy data associated with device start-up and one or more hardware devices of a mobile device. The entropy data is pooled in randomly-allocated memory. In response to a demand for entropy, the entropy pool is examined for available entropy. That entropy is then provided (in whole or part) from the pool. Using the entropy provided from the pool, an application produces a true random number. The true random number is then used to generate the cryptographic material. To prevent re-use, the address locations from which the entropy is provided are then cleared (zeroed) or otherwise freed.

The subject matter described herein has many advantages. The technique provides a method of pooling and managing entropy from true random number generators (e.g., the device itself, the one or more hardware sources, or the like). By accessing the entropy pool, the operating system and device-based applications have a ready-available source of entropy of use in true random number generation. The resulting true random numbers can then be used for various cryptographic operations that may be required by the device.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes and are not meant to limit the scope of the described subject matter.

More generally, computing devices within the context of the disclosed subject matter are each a data processing system (such as shown in FIG. 2) comprising hardware and software, the device may communicate with other devices and systems over a network, such as the Internet, an intranet, an extranet, a private network, or any other communications medium or link.

Still more generally, the subject matter described herein can take the form of an entirely hardware embodiment, an entirely software embodiment or an embodiment containing both hardware and software elements. In a preferred embodiment, the entropy pooling management function is implemented in software, which includes but is not limited to firmware, resident software, microcode, and the like. Furthermore, as noted above, the entropy pooling functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the entropy pooling mechanism and random number generation components are implemented in a special purpose computer, preferably in operating system or application software executed by one or more processors. The software is maintained in one or more data stores or memories associated with the one or more processors, and the software may be implemented as one or more computer programs. Collectively, this special-purpose hardware and software comprises the entropy pooling mechanism and the associated true random number generation mechanism described.

The entropy pooling function may be implemented as an adjunct or extension to an existing cryptographic application, device, system or process.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a mobile device having an operating system of the type described, but this will be a typical implementation. As noted, the above-described function may be used in any system, device, sub-system, site, or the like wherein devices may generate entropy data.

Having described our invention, what we now claim is as follows:

1. A method to generate a true random number for use in a cryptographic operation, the method operative in a mobile device comprising an operating system, and one or more hardware devices, comprising:
    allocating random available storage areas of a data store of the mobile device to store entropy data in an entropy data pool;
    pooling into the data store of the mobile device entropy data generated from the one or more hardware devices to form the entropy data pool; and
    determining whether sufficient entropy data is present in the data store in response to a request, including
    responsive to sufficient entropy data being present in the data store, retrieving entropy data from particular locations in the data store;
    using the entropy data retrieved to generate a true random number, and
    clearing the particular locations from which the entropy data was retrieved; and
    responsive to insufficient entropy data being present in the data store, using an operating system-based random number generator to generate the true random number.

2. The method as described in claim 1 wherein a second storage area of the data store is allocated when a first storage area of the data store that includes the particular locations is no longer capable of receiving additional entropy data.

3. The method as described in claim 1 further including supplementing the entropy data pool dynamically as one or more of the hardware devices generate additional entropy.

4. The method as described in claim 1 wherein the particular locations are cleared by zeroing.

5. The method as described in claim 1 wherein the request is received and the true random number generated without requiring the mobile device operating system to switch on the one or more hardware devices to obtain entropy data.

6. An apparatus associated with a mobile device, the mobile device comprising an operating system, and one or more hardware devices that generate entropy data, the apparatus comprising:
    a processor;
    computer memory comprising a data store, and computer program instructions, the computer program instructions comprising:
        program code to allocate random available storage areas of the data store of the mobile device to store entropy data in an entropy data pool;
        program code to pool into the data store of the mobile device entropy data generated from the one or more hardware devices to form the entropy data pool;
        program code to determine whether sufficient entropy data is present in the data store in response to a request;

responsive to sufficient entropy data being present in the data store, program code to retrieve entropy data from particular locations in the data store, to use the entropy data retrieved to generate a true random number, and to clear the particular locations from which the entropy data was retrieved; and responsive to insufficient entropy data being present in the data store, program code to use an operating system-based random number generator to generate the true random number.

7. The apparatus as described in claim 6 wherein a second storage area of the data store is allocated when a first storage area of the data store that includes the particular locations is no longer capable of receiving additional entropy data.

8. The apparatus as described in claim 6 further including program code to supplement the entropy data pool dynamically as one or more of the hardware devices generate additional entropy.

9. The apparatus as described in claim 6 wherein the particular locations are cleared by zeroing.

10. The apparatus as described in claim 6 wherein the request is received and the true random number generated without requiring the mobile device operating system to switch on the one or more hardware devices to obtain entropy data.

11. A computer program product in a non-transitory computer readable medium for use in a mobile device, the mobile device comprising an operating system, and one or more hardware devices that generate entropy data, the computer program product holding computer program instructions comprising:

program code to allocate random available storage areas of a data store of the mobile device to store entropy data in an entropy data pool;

program code to pool into the data store of the mobile device entropy data generated from the one or more hardware devices to form the entropy data pool;

program code to determine whether sufficient entropy data is present in the data store in response to a request;

responsive to sufficient entropy data being present in the data store, program code to retrieve entropy data from particular locations in the data store, to use the entropy data retrieved to generate a true random number, and to clear the particular locations from which the entropy data was retrieved; and responsive to insufficient entropy data being present in the data store, program code to use an operating system-based random number generator to generate the true random number.

12. The computer program product as described in claim 11 wherein a second storage area of the data store is allocated when a first storage area of the data store that includes the particular locations is no longer capable of receiving additional entropy data.

13. The computer program product as described in claim 11 further including program code to supplement the entropy data pool dynamically as one or more of the hardware devices generate additional entropy.

14. The computer program product as described in claim 11 wherein the request is received and the true random number generated without requiring the mobile device operating system to switch on the one or more hardware devices to obtain entropy data.

* * * * *